Figure 1:
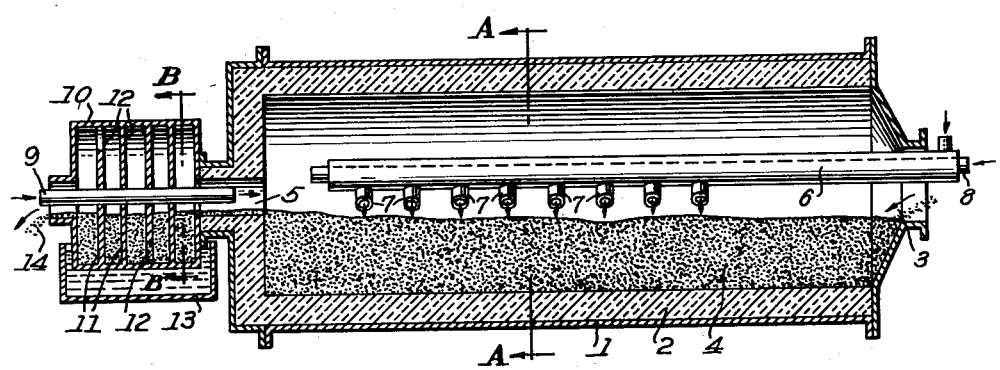
Figure 2:
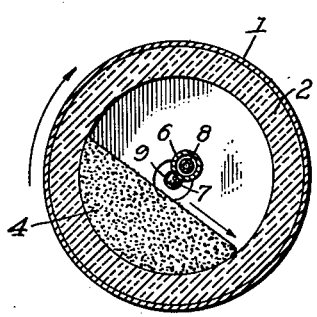
Figure 3:
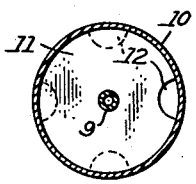

May 21, 1940. B. M. S. KALLING ET AL 2,201,900
METHOD FOR DECARBONIZING A CARBON HOLDING METAL SUCH AS PIG IRON
Filed April 26, 1938

Inventors.
Bo Michael Sture Kalling
Ivar Rennerfelt
by Potter, Pierce & Scheffler
their Attorneys Patented May 21, 1940

2,201,900

UNITED STATES PATENT OFFICE 2,201,900

METHOD FOR DECARBONIZING A CARBON HOLDING METAL, SUCH AS PIG IRON

Bo Mikael Sture Kalling and Ivar Rennerfelt, Djursholm, Sweden

Application April 26, 1938, Serial No. 204,282
In Sweden May 5, 1937

12 Claims. (Cl. 148—16)

It is previously known that cast iron objects may be decarbonized even below their melting temperature, if they are heated a sufficient time together with substances capable of yielding oxygen to carbon when heated. According to the methods developed until now on the basis of this principle—the malleable iron and annealing processes—the decarbonizing operation requires, however, a rather long time and much manual labour and because such operations also are of an intermittent nature, that principle for decarbonizing pig iron to steel has not acquired any considerable importance as a steel producing large scale method.

Our invention refers to a method of decarbonizing especially pig iron and the like in solid shape, according to which the process may be performed so rapidly, with so little manual labour and otherwise in such manner, that it may be advantageously used by the modern steel making industry as a large scale decarbonizing process. The carbon content may, furthermore, be lowered to values which are very difficult or even impossible from an economical point of view to reach with the decarbonizing methods so far in actual use.

According to our invention the pig iron or an alloy is finely subdivided which may be done by crushing the material but substantially cheaper and better, while the iron is in a liquid shape by means of a method known as granulation. The material may become granulated for instance by causing it to flow from a blast furnace, a cupola furnace or any other melting furnace or a mixer down into water, which is being vigorously stirred or by subdividing a spouting stream of iron or other material by exposing it to a jet of steam or compressed air or also by other mechanical means. The advantage of using granulated instead of crushed iron is clearly proven by a smaller tendency of the granules to bake together during the operation because of the more rounded and smooth form of the little balls, especially at elevated temperatures for instance in the neighbourhood of 1200° C.

It has been found desirable to reduce the size of the granules to a diameter, which for the main part is below about 2 m. m. With a grain size of for instance 1 m. m. about 80% of the carbon may be removed in 30 minutes, thus, with almost the velocity of the Bessemer process, whereas the time required under similar circumstances for about 4 m. m. grains is about 6 hours. Especially if it is required to reduce the carbon to very low values, it is important not to use too big granules.

Because the time of decarbonizing varies in grains of different sizes, it might be suitable to divide the granulated material in different classes and to decarbonize each class by itself. The product that has been decarbonized may also be classified into different sizes with somewhat different percentages of carbon in the different sizes. Especially favourable conditions may be obtained if the granulation is so performed, that the granules become more or less hollow and thin walled on account of the development of gas at the moment of solidifying.

The decarbonizing must be so performed, that the carbon becomes oxidized without a simultaneous noticeable or undesirable oxidation of the iron taking place. This may be attained if the raw material is decarbonized by means of oxides of iron, for instance in the form of high grade iron ore concentrates, which on account of a reaction with the carbon of the granules is at least partly reduced to iron. If it is desired to keep the charge in motion during the decarbonizing operation, which considerably facilitates the practical employment of the process, such addition at least of a considerable quantity of iron oxides to the charge may bring some disadvantages. At the temperature of about 1000° C., which is required for a sufficiently rapid decarbonizing, the FeO has a strong tendency of sticking together, which might cause the charge to form balls and to stick to the furnace walls. Oxidation of the carbon should in this case, therefore, take place without mixing any considerable quantity of oxides into the granules. It has, furthermore, been found, that the decarbonizing may be effected equally rapidly and without any risk for oxidizing the iron in an atmosphere of a suitable composition.

In order to oxidize the carbon of the granules substantially without the iron being attacked at an operating temperature of for instance 1000° C. according to the position of equilibrium of the reaction in question, it is a condition that the ratio of $CO_2:(CO+CO_2)$ in the reaction gas does not exceed 1:4. At a lower temperature a somewhat higher ratio than 0.25 is permissible, whereas at a higher temperature a decrease of the $CO_2$ content is required. To make the reaction as rapid as possible the carbon dioxide content should be in the neighbourhood of this limit value. The adjustment of the contents of CO and $CO_2$ in the furnace atmosphere is best attained by adding free oxygen, which changes a certain quantity of the CO-gas, which is formed according to the equation of decarbonizing: $CO_2+C \rightarrow 2CO$, to carbon dioxide, so that a suitable gas composition is reached. The process, thus, contrary to the decarbonizing with iron oxides only, becomes exothermic, which is of advantage for the practical development of the new method.

It has been found possible by means of this new method of decarbonizing to reduce the carbon content to lower values than has been possible with any one of the common methods of decarbonizing iron in a liquid state and this even without any considerable loss of iron or other elements except the carbon itself.

In an atmosphere consisting only of CO and $CO_2$ in the above mentioned relations at atmospheric pressure it is possible, according to comprehensive recent investigations, to reduce the carbon to 0.01% at 1200° C. By diluting with other gases or by means of a reduced gas pressure the carbon may, theoretically, be lowered still more at this temperature and the value of 0.01% C. is reached already at 1000° C., if the gas pressure of $CO+CO_2$ is lowered to 0.3 atmosphere.

As dilution gases $N_2$ and/or a mixture of $H_2$ and $H_2O$ may be used. The presence of $H_2$ is, furthermore, of advantage as the velocity of reaction is thereby accelerated. As an example of the possibility of rapidly decarbonizing pig iron to a low percentage of carbon may be mentioned, that pig iron granules having a size of 1.7 to 1.2 m. m., when heated to 1000° C. in a gas atmosphere holding 10.5% $CO_2$ and 27.5% CO, the rest substantially being nitrogen, may be decarbonized to about 0.01% C. in about three hours time, substantially without any oxidation of iron taking place simultaneously.

When it is the question of producing very low carbon iron, it might be economical to conduct the process so that some oxidation takes place on the surface of the granules. When afterwards melting this product the oxide on the surface of the grains reacts below the melting temperature of the charge with the carbon still remaining in the granules and a lower carbon content will in this way be obtained in the resulting liquid bath, whereby the decarbonizing will not have to be especially forced before the melting afterwards of the granules. The decarbonizing oxides will in this way be more suitably distributed in the charge than in the case of a special oxidation material being added at the melting operation, which latter method may, however, also be advantageously employed.

The considerable advantages of the method before other decarbonizing methods for producing iron with a low content of carbon are clearly noticeable already at contents of C=0.10% and quite especially at C=0.05%. Contents of carbon ≤0.03% are difficult to reach at all by means of the common methods of decarbonizing in a liquid state of the raw materials.

The heat economy of the process depends upon the possibility of using the chemical and physical heat content of the reaction gases. If the gas developed in the charge is completely combusted to $CO_2$, the process becomes so strongly exothermic, that it may take place without any material addition of heat from the outside, but there will simultaneously be some danger for a certain oxidation also of the iron.

It has, however, been found, that if the charge is kept in motion with a sufficient velocity the gases may be practically completely combusted and the greatest part of their heat content utilized for the performance of the process without a permanent oxidation of the iron taking place. The gas should then be conducted in a direction opposite to that of the charge and the combustion should take place successively so that the ratio of $CO_2:CO$ steadily decreases together with the reduction of the carbon. It is of especial importance, that the ratio of $CO_2:CO$ does not too much exceed the position of equilibrium in the zone of final decarbonizing, especially in the case of very low values of carbon.

In the case of higher contents of carbon a greater surplus of $CO_2$ is permissible in the gas atmosphere above the charge, as the reaction gas, rich in CO, that is developed therein, protects the iron against a noticeable oxidation.

It has been found to be of great importance, that the addition of oxygen does not become so liberal, that there will be an excess of free oxygen in the furnace and especially at the heated walls of the furnace there must be no free oxygen present. If that would be the case, the fine material, which might adhere to the furnace wall at the joints and cracks, will be easily oxidized causing thereby a considerable rise of the temperature, whereby it becomes firmly sintered to the wall and will cause new material to stick, which would mean a very great inconvenience and possibly prevent a continuous operation.

As any considerable introduction of air into the zone of final decarbonizing is not advisable, it might be difficult to maintain a sufficiently elevated temperature in the said zone. One may, however, proceed so, that the charge, while still high in carbon, is heated to a higher temperature than required for performing the decarbonizing, whereby the final removal of the carbon may without inconvenience take place at a lower temperature.

If an addition of heat from the outside is required, this may be done by supplying some suitable kind of fuel or by means of an electric current admitted into the granular charge. A highly suitable gas is for instance reaction gas from a blast furnace or other furnace for producing pig iron, which often has a ratio of $CO_2:CO$, that is very suitable for the final decarbonizing according to this invention. When using gaseous fuel it may be of advantage to introduce it in a heated state in order to add heat to the charge also in this way, especially in the zone of final decarbonizing. The gas should be introduced at the discharge end of the furnace. One may also supply carbon or other solid or liquid fuel, eventually together with the granules. The carbon will thereby, because of its lower specific gravity, stay principally on top of the charge during its movement along the furnace and may be combusted in a relatively strongly oxidizing atmosphere without any danger of the underlying mass of small iron grains being oxidized. The addition of a liquid fuel has also been found valuable because of the increase of the illuminating power of the flame which is being caused in that way.

It has, furthermore, been found, that some desulphurizing of the granules may be obtained simultaneously with the decarbonizing by adding some lime to the charge. The lime may be wholly or partly replaced by other bases such as BaO or MgO. Also the granulating operation may cause a certain elimination of sulphur.

Several kinds of already existing furnaces may with certain modifications be used for the process but according to the invention a very suitable type of furnace is a rotating, tubular type, somewhat similar to the cement burning kilns. It has been ascertained, that decarbonizing may be effected in this type of furnace at temperatures up to about 1200° C. without any tendency of the granules to stick or ball together to lumps, if the oxidation is done with a gas mixture, the composition of which according to the preceding statements, is so adjusted, that a noticeable oxidation of the iron does not occur.

It is of a great importance for carrying out the process, in a rotating furnace, that the depth of the charge is sufficient and the velocity of rotation is high enough. Otherwise an even and rapid decarbonizing can not be obtained without oxidation of the iron, which means loss of metal and eventually sticking to the furnace walls and formation of lumps. The walls of the furnace should be well heat insulated and may be provided with a mantle of heat resisting metal on the inside, if this is suitable.

During trial operations it has been found that the charge should occupy at least about 25% of the space and preferably over 35% in the hottest zone, whereby a suitable mixing motion of the grainy charge is secured. The velocity of rotation ought to be so great, that the entire charge is sufficiently rapidly brought into contact with the decarbonizing gas, respectively the gas mixture. A circumferential speed of at least 5 met. per minute and preferably above 10 met. per minute has proven itself to be desirable for obtaining good results. Especially when forcing the carbon content down to very low values it might be suitable to provide means in the furnace for lifting the charge higher up, causing it during the rotation of the furnace to fall down through the hot decarbonizing gases.

In the accompanying drawing Fig. I illustrates in a longitudinal section a tubular, rotating furnace adapted for decarbonizing granulated material according to the invention. Fig. II is a cross section at the lines A—A in Fig. I and Fig. III is a cross section at the lines B—B in Fig. I.

In Fig. I a rotatable furnace mantle is indicated by 1, a heat insulating lining with 2. Means for rotating the furnace are not particularly shown on the drawing. The furnace is provided with an opening 3 at one end for admitting the granular carbon holding material 4, which accumulates in the furnace to such a level, that it may leave the slightly inclining furnace at the opening 5 in the opposite end after having passed slowly along the furnace due to its rotation and inclining position.

The furnace is provided with a tube 6 excentrically located in the charging opening and projecting towards the discharge end inside of the furnace. This tube admits oxidizing gases, for instance air, through a plurality of tuyères 7 which are directed in a suitable angle towards the inclining surface of the charge, from which CO-gases, produced by reaction between the carbon of the granules and $CO_2$ in the furnace atmosphere, are emanating along the surface of the charge, beginning at the zone, where the temperature is sufficiently elevated for the said reaction.

Inside of the tube 6 another tube 8, indicated by dotted lines, is provided for introducing a reaction gas containing $CO_2$ and CO in suitable proportions, for instance blast furnace gas, into the zone of final decarbonizing as indicated by an arrow at the end of the tube 8. For admitting other gases or fuel a tube 9 is projecting into the furnace through the discharge end opening 5. The decarbonized granules may be caused to pass through a cooling device 10 of well known construction consisting of a plurality of shields 11 having openings 12 at their circumference permitting the granules to pass along slowly. The shields are disposed in a cylindrical mantle which is cooled by dipping into a cistern 13 provided with a quantity of water. When leaving the furnace the granules 14 are cooled down to such a temperature, that the surrounding air does not cause an oxidation of the granules. In Fig. II a section of the air admitting tube is indicated by 6, tuyères by 7 and a gas admitting tube inside of the air tube by 8. The charge, the surface of which is inclining at a certain angle, is indicated by 4. The granules are rolling from the upper edge of the inclining surface down to the lower edge as indicated by an arrow and are during this motion exposed to the action of the decarbonizing atmosphere above the charge. It is important that the tuyères 7 are so located on the tube 6, that the oxygen of the air is fully consumed for oxidation of the CO-gas to $CO_2$ gas, so that free oxygen can not exist near the hot furnace wall above the charge, at least not in damaging quantities.

In Fig. III the cooled mantle is shown by 10, a central gas pipe by 9 and openings in the dividing shields by 12. Means for admitting an electric current into the charge for heating the same have not been especially shown.

The invention is not particularly limited to the decarbonizing only of white or gray pig iron. It may be used also for decarbonizing all kinds of steel scrap such as turnings and spanes and also carbon holding sponge iron in granular shape.

The invention is useful also for carbon holding ferro alloys the carbon of which may be oxidized according to the reactions governing the process.

Having now fully described our invention we claim:

1. Method of decarbonizing iron at a temperature below its melting point, which comprises passing the iron in finely divided form continuously through a revolving, internally heated, tubular furnace, heating it to a decarbonizing, non-melting temperature by combustion of CO-gas produced in the charge by means of free oxygen supplied into the furnace by causing air to blow against the inclining surface of the longitudinally moving charge so as to cause oxidation of CO to $CO_2$ in close proximity to the hot, gas producing charge, substantially when the particles are passing downwards along the inclining surface of the charge.

2. Method according to claim 1, in which the circumferential velocity of the charge at the inside of the furnace wall is not less than 5 meters per minute.

3. Method according to claim 1, in which the charge is caused to occupy at least 25% of the free space of the furnace in the hottest zone.

4. Method according to claim 1, in which combustion air is introduced in such a way as to prevent free oxygen to exist near the furnace wall.

5. Method according to claim 1, in which air is blown towards the inclining surface of the charge, a jet of gas, substantially of the composition of blast furnace gas, being supplied near the zone of final decarbonizing.

6. Method according to claim 1, in which a small amount of iron ore powder is added to the charge.

7. Method according to claim 1, in which the subdivided charge is classified according to grain sizes.

8. Method according to claim 1, in which the iron is subdivided in molten state.

9. Method of decarbonizing iron at a temperature below its melting point, which comprises the subdividing of the iron while in a molten condition, passing the subdivided iron continuously through a revolving, internally heated tubular furnace, heating it to a decarbonizing, non-melting temperature by combustion of CO-gas produced in the charge by means of free oxygen supplied into the furnace by causing air to blow against the inclining surface of the longitudinally moving charge so as to cause oxidation of CO to $CO_2$ in close proximity of the hot, gas producing charge, the carbon of the charge serving as the principal fuel for raising the temperature of the moving charge to the point required for decarbonizing.

10. Method of decarbonizing pig iron, consisting in granulating it, passing the granules into a furnace and through zones of gradually increasing temperature, causing the mass of granules to assume an inclining surface by revolving the furnace, gradually heating it to a decarbonizing temperature by causing jets of air to blow against the hot CO-gas that emanates from the charge to form a mixture of $CO_2$, CO and $N_2$, and passing the combustion gases along the surface of the moving charge counter-current to the movement of the granules.

11. Method according to claim 10, in which a heating gas of substantially the composition of blast furnace gas is introduced into the furnace adjacent the end thereof at which the granules are discharged.

12. Method of decarburizing ferrous metal at a temperature below its melting point which comprises substantially continuously stirring the entire mass of a charge of the ferrous metal in finely divided solid form to prevent the particles from sintering together and to expose fresh free surfaces while heating the charge to a decarburizing non-melting temperature by combustion of CO-gas produced in the charge by means of free oxygen supplied by causing air to blow against the free surfaces of the charge so as to cause oxidation of CO to $CO_2$ in close proximity to the hot gas producing charge.

BO MIKAEL STURE KALLING.
IVAR RENNERFELT.